(12) United States Patent
Djebara et al.

(10) Patent No.: US 8,842,419 B2
(45) Date of Patent: Sep. 23, 2014

(54) NOTCHED LEAD TAPE FOR A SOLID ELECTROLYTIC CAPACITOR

(75) Inventors: Lotfi Djebara, Paris (FR); Pavel Bosak, Lanskroun (CZ); Ludek Kubes, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 62 days.

(21) Appl. No.: 13/483,312

(22) Filed: May 30, 2012

(65) Prior Publication Data

US 2013/0321986 A1    Dec. 5, 2013

(51) Int. Cl.
*H01G 4/228* (2006.01)
*H01G 9/145* (2006.01)

(52) U.S. Cl.
USPC .......................... 361/540; 361/528; 29/25.03

(58) Field of Classification Search
USPC ................................................. 361/528, 540
See application file for complete search history.

(56) References Cited

U.S. PATENT DOCUMENTS

| | | | |
|---|---|---|---|
| 3,345,545 A | 10/1967 | Bourgault et al. |
| 4,945,452 A | 7/1990 | Sturmer et al. |
| 5,949,639 A | 9/1999 | Maeda et al. |
| 6,191,936 B1 | 2/2001 | Webber et al. |
| 6,447,570 B1 | 9/2002 | Pozdeev-Freeman |
| 7,116,548 B2 | 10/2006 | Satterfield, Jr. et al. |
| 7,359,181 B2 | 4/2008 | Kuriyama |
| 7,594,937 B2 | 9/2009 | Amita et al. |
| 7,929,274 B2 | 4/2011 | Reed et al. |
| 8,066,783 B2 | 11/2011 | Takeda |
| 8,482,902 B2 | 7/2013 | Ishida et al. |
| 2005/0237698 A1 | 10/2005 | Postage et al. |
| 2007/0033783 A1* | 2/2007 | Takeda .......................... 29/25.03 |
| 2011/0149476 A1 | 6/2011 | Saida et al. |

FOREIGN PATENT DOCUMENTS

| | | | |
|---|---|---|---|
| JP | 0722289 A | | 1/1995 |
| JP | 08008143 A | * | 1/1996 |
| JP | 2000012387 A | * | 1/2000 |
| JP | 2003229327 A | | 8/2003 |
| JP | 2006295075 A | | 10/2006 |
| JP | 2008305824 A | * | 12/2008 |
| WO | WO 9849356 A1 | | 11/1998 |
| WO | WO 2005106905 A1 | | 11/2005 |

OTHER PUBLICATIONS

Abstract of Japanese Patent—JP2008305824 dated Dec. 18, 2008, 2 pages.

(Continued)

*Primary Examiner* — Eric Thomas
(74) *Attorney, Agent, or Firm* — Dority & Manning, P.A.

(57) ABSTRACT

A capacitor containing a solid electrolytic capacitor element including a sintered porous anode body and a relatively large width and/or thickness anode lead tape is provided. The tape is electrically connected to the anode body for connection to an anode termination. Further, the tape has a width that is at least about 20% of the width of the anode body to improve the points of contact between the anode body and tape to reduce ESR. A portion of the tape extends from a surface of the anode body in a longitudinal direction. At least one notch can be formed in the portion of the tape that extends from the anode body. The notch can be formed via a laser or by cutting, punching, or sawing and can serve as the point of electrical connection between the anode termination and the lead tape.

27 Claims, 4 Drawing Sheets

(56) References Cited

OTHER PUBLICATIONS

Abstract of Japanese Patent—JP2009266931 dated Nov. 12, 2009, 2 pages.
Search Report for GB1309411.5 dated Aug. 29, 2013, 4 pages.
Djebara et al., U.S. Appl. No. 13/454,360, filed Apr. 24, 2012, Solid Electrolytic Capacitor Containing Multiple Sinter Bonded Anode Leadwires.
Djebara et al., U.S. Appl. No. 13/454,370, filed Apr. 24, 2012, Crimped Leadwire for Improved Contact with Anodes of a Solid Electrolytic Capacitor.
Djebara et al., U.S. Appl. No. 13/483,299, May 30, 2012, Notched Lead Wire for a Solid Electrolytic Capacitor.
Hintz et al., "Anode Lead Wire Pre-Treatments for Improved Lead Wire Bonding in Tantalum Capacitor Anodes Processed by De-Oxidation/Sintering," CARTS USA, Mar. 15-18, 2010, New Orleans, Louisiana, 13 pages.
Vasina et al., "Failure Modes of Tantalum Capacitors Made by Different Technologies," CARTS USA, Mar./Apr. 2001, 6 pages.
Related U.S. Patent Application Form.

\* cited by examiner

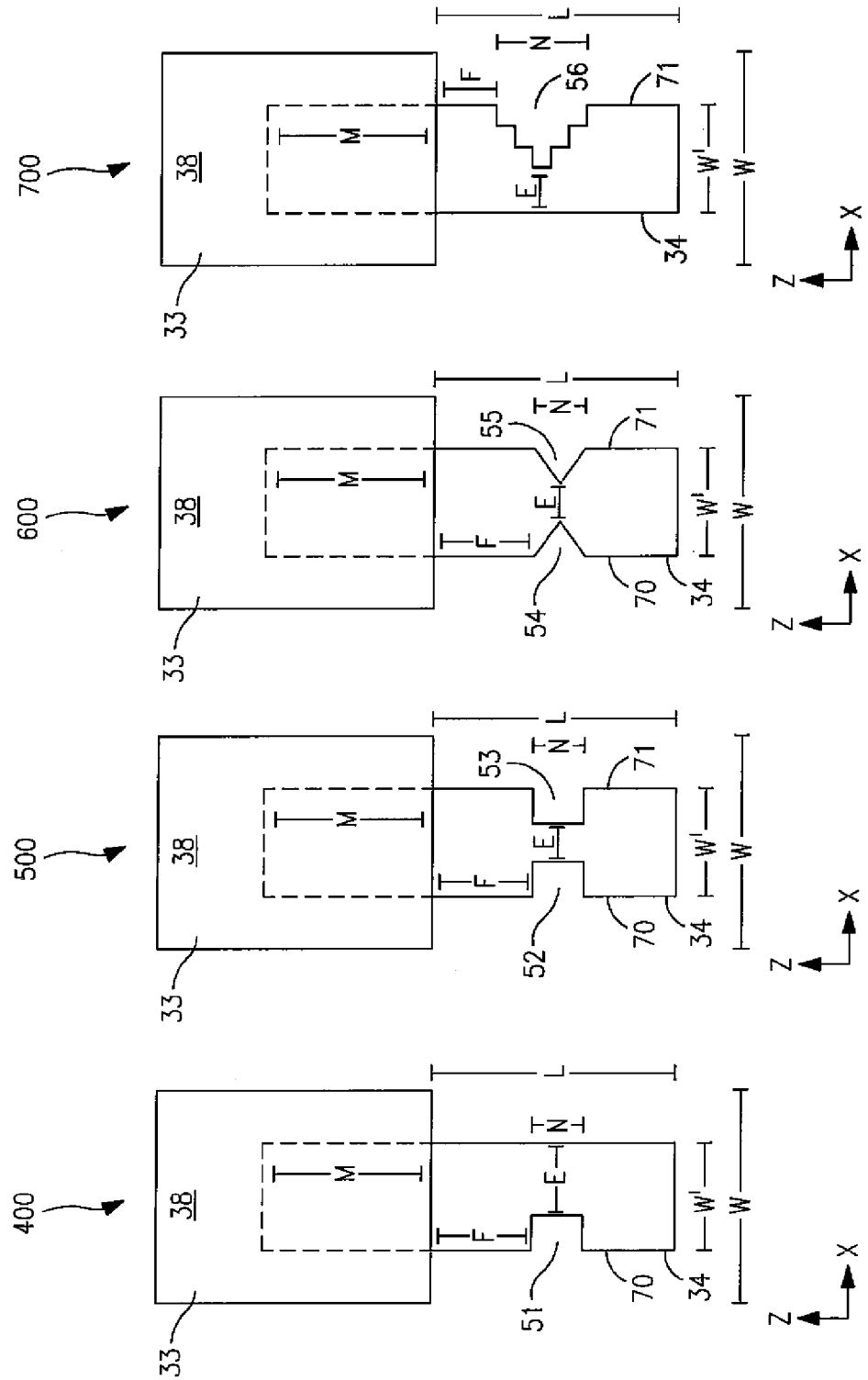

NOTCHED LEAD TAPE FOR A SOLID ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with a lead wire extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that the small particle size of the tantalum particles can decrease the volumetric contact between the anode body and the lead wire. In fact, it can be difficult to find many points of contact between the lead wire and the powder particles. When the contact area between the anode body and the wire is decreased, there is a corresponding increase in resistance where the wire and the anode meet. This increased equivalent series resistance (ESR) results in a capacitor exhibiting decreased electrical capabilities. While several efforts have been made to improve the connection between the anode body and anode lead wire, these efforts involve additional processing steps that can be disadvantageous from a manufacturing standpoint. As such, a need currently exists for an improved solid electrolytic capacitor having increased points of contact between the anode body and the anode lead, thereby significantly improving electrical capabilities by achieving ultralow ESR levels.

SUMMARY OF THE INVENTION

In accordance with one embodiment of the present invention, a solid electrolytic capacitor is disclosed that comprises a capacitor element. The capacitor element comprises a sintered, porous anode body having a height and a width, an anode lead tape having a thickness and further having a width that is at least about 20% of the width of the porous anode body, a dielectric layer overlying the sintered porous anode body, and a cathode overlying the dielectric layer that includes a solid electrolyte. Further, the anode lead tape has a first portion positioned within the anode body and has a second portion extending from a surface of the anode body in a longitudinal direction. The second portion has a notched region wherein at least one notch is located.

In accordance with another embodiment of the present invention, a method for forming a solid electrolytic capacitor comprising a sintered, porous anode body having a height and a width is disclosed. The method comprises positioning a first portion of an anode lead tape having a thickness and further having a width that is at least about 20% of the width of the porous anode body within a powder formed from a valve metal composition such that a second portion of the anode lead tape extends from a surface of the anode body in a longitudinal direction. The method further comprises compacting the powder around the first portion of the anode lead tape, sintering the compacted powder and the first portion of the anode lead tape to form the porous anode body, forming a notched region in the second portion of the anode lead tape wherein at least one notch is located, and welding the anode lead tape to an anode termination at the notched region to form an electrical connection between the anode lead tape and the anode termination.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 4 is a top view of one embodiment of the electrolytic capacitor of the present invention;

FIG. 5 is a top view of another embodiment of the electrolytic capacitor of the present invention;

FIG. 6 is a top view of still another embodiment of the electrolytic capacitor of the present invention;

FIG. 7 is a top view of yet another embodiment of the electrolytic capacitor of the present invention;

Figure 1:
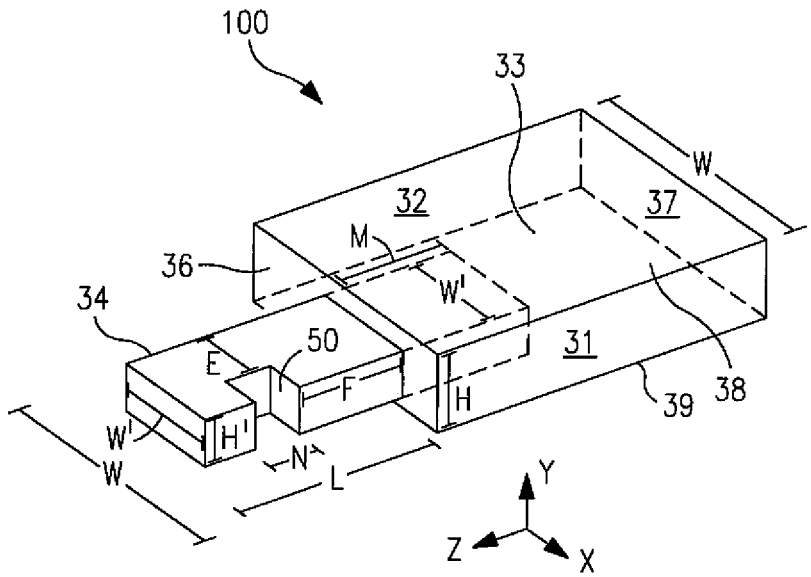
FIG. 1 is a perspective view of one embodiment of the electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention.

Generally speaking, the present invention is directed to a solid electrolytic capacitor containing a capacitor element that includes a sintered porous anode body, a dielectric layer overlying the sintered porous anode body, and a cathode overlying the dielectric layer that includes a solid electrolyte. An anode lead tape can be electrically connected to the anode body for connection to an anode termination. The anode lead tape can have a relatively large thickness (e.g., height), width, or both to improve the points of contact between the porous anode body and the tape, thus reducing the capacitor's ESR. For example, the thickness (e.g., height) of the anode lead tape can be from about 5% to about 70% of the height of the porous anode body. In other embodiments, the thickness of the anode lead tape can be from about 10% to about 65% of the height of the porous anode body, and in still other embodiments, the thickness of the anode lead tape can be from about 15% to about 60% of the height of the porous anode body. Further, the width of the anode lead tape can be from about 20% to about 75% of the width of the porous anode body. In other embodiments, the width of the anode lead tape can be from about 25% to about 70% of the width of the porous anode body, and in still other embodiments, the width of the anode lead tape can be from about 30% to about 65% of the width of the porous anode body.

A portion of the anode lead tape can be positioned within the anode body and a portion of the anode lead tape can extend from a surface thereof in a longitudinal direction. At least one notch can be formed in the portion of the anode lead tape extending from a surface of the anode body. The anode lead tape can be electrically connected to an anode termination, or lead frame, while the cathode can be electrically connected to a cathode termination by any technique generally known in the art. Regardless of the technique used, the connection between the anode lead tape and the anode termination can be formed at the notched region of the tape. Moreover, the notch can be positioned anywhere along the portion of the anode lead tape extending from the surface of the anode body, so long as there is a sufficient distance between the surface and the notch so that the connection can be made without damaging the capacitor. Further, the presence of the notch on the lead tape allows for a decrease in the amount of energy required to form an electrical connection between the anode lead tape and the anode termination. Various embodiments of the solid electrolytic capacitor of the present invention are discussed in more detail below.

Referring now to FIG. 1, one particular embodiment of a capacitor element 100 that is formed from a porous anode body 33 and an anode lead tape 34 is shown. Generally, FIG. 1 is a perspective view of the porous anode body 33 that is formed around anode lead tape 34 and shows the dimensions of the porous anode body 33 and the anode lead tape 34. For instance, the porous anode body 33 can have a first side surface 31, a second side surface 32, a front surface 36, a rear surface 37, an upper surface 38, and a lower surface 39. The porous anode body 33 can also have a width W that can refer, for example, to the width of the front surface 36 and rear surface 37, and a height or thickness H that can refer, for example, to the height or thickness of the front surface 36 and rear surface 37. The width W of the front surface 36 of the porous anode body 33 can range from about 400 micrometers to about 6000 micrometers, in some embodiments from about 800 micrometers to 5000 micrometers, and in some embodiments from about 1200 micrometers to about 4000 micrometers. Additionally, the height H of the front surface 36 of the porous anode body 33 can range from about 200 micrometers to about 4000 micrometers, in some embodiments from about 400 micrometers to about 3000 micrometers, and in some embodiments from about 600 micrometers to about 2500 micrometers.

In the particular embodiment shown in FIG. 1, the porous anode body 33 is in the shape of a rectangular pellet. In addition to having a rectangular shape, however, the anode can have a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Further, although FIG. 1 shows that the anode lead tape 34 is rectangular in shape and generally has a width W' and a thickness/height H', the anode lead tape 34 disclosed herein may possess any desired cross-sectional shape, such as circular, elliptical, square, etc. As shown in FIG. 1, the anode lead tape 34 can have a first portion M that is positioned within the anode body 33 and a second portion L that extends from a surface of the porous anode body 33, such as front surface 36. The thickness/height H' and/or the width W' of the anode lead tape 34 may vary depending on the overall size of the anode body 33. In any event, the larger the thickness H' and/or the width W' of the tape, the larger the number of points of contact between the porous anode body 33 and the anode lead tape 34 along first portion M, which results in a lower ESR and improved electrical capabilities of the capacitor.

As shown in FIG. 1, the anode lead tape 34 extends from the front surface 36 of the porous anode body 33, however, it should be understood that the anode lead tape 34 may also extend from any other surface of the porous anode body 33. Further, the second portion L of anode lead tape 34 that extends from a surface of the porous anode body 33 can have a width W' and a thickness/height H', which also refers to the width and thickness/height of the first portion M of the anode lead tape 34 that is positioned within the porous anode body 33. The size of the anode lead tape 34 may vary depending on the overall size of the anode body 33. In any event, the larger the width W' and/or the height or thickness H' of the anode lead tape 34, the larger the number of points of contact between the porous anode body 33 and the anode lead tape 34, which results in a lower ESR.

As shown in FIG. 1, the width W' of the anode lead tape 34 can be uniform along its length, including first portion M and second portion L, except that at least one notch 50 can be present on the anode lead tape 34 at notch region N along the second portion L. The at least one notch 50 can be rectangular, square, circular, elliptical, triangular, stepped, U-shaped, V-shaped, or any other suitable shape. Because of the notch 50, the anode lead tape 34 has a smaller second width E along the notch region N of the anode lead tape 34. Further, although FIG. 1 shows a notch 50 formed on an X-axis facing surface of the anode lead tape 34 (e.g., on the right side) so that the anode lead tape 34 has a reduced width E at the notch 50 along the notch region N, the at least one notch 50 can also be formed on a Y-axis facing surface of the anode lead tape 34 (e.g., on the upper surface) so that the anode lead tape 34 has a reduced thickness/height G at the notch 50 along the notch region N, as shown in capacitor 200 of FIG. 2. Further still, multiple notches can be formed on both the X-axis facing surfaces and the Y-axis facing surfaces of the anode lead tape 34 so that the anode lead tape has a reduced with E and a reduced thickness/height G along notch region N, as is shown in FIG. 3 and discussed in more detail below.

As discussed above, the anode lead tape 34 has a width W' along the first portion M and the second portion L. The width W' is uniform throughout the anode lead tape except at notch region N, which has a width E. The width W' can generally be from about 20% to about 75% of the width W of the front surface 36 of the porous anode body 33. For instance, the width W' of the anode lead tape 34 can range from about 80 micrometers to about 4500 micrometers, in some embodiments from about 160 micrometers to about 3750 micrometers, and in some embodiments from about 240 micrometers to about 3000 micrometers. In still other embodiments, the width W' of the anode lead tape 34 can be from about 25% to about 70% of the width W of the front surface 36 of the porous anode body 33, such as from about 30% to about 65% of the width W of the front surface 36 of the porous anode body 33.

Figure 2:
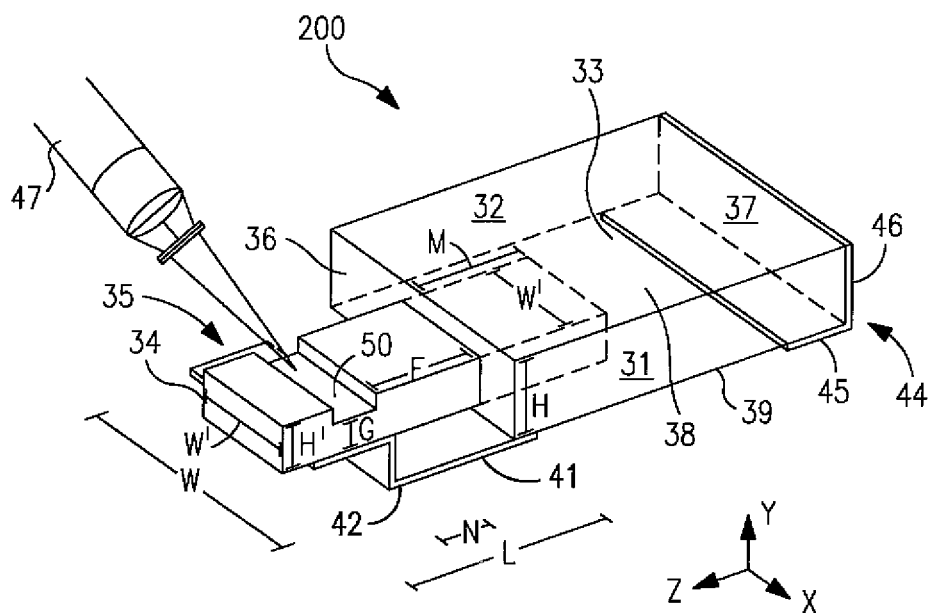
FIG. 2 is a perspective view of another embodiment of the electrolytic capacitor of the present invention.
Figure 3:
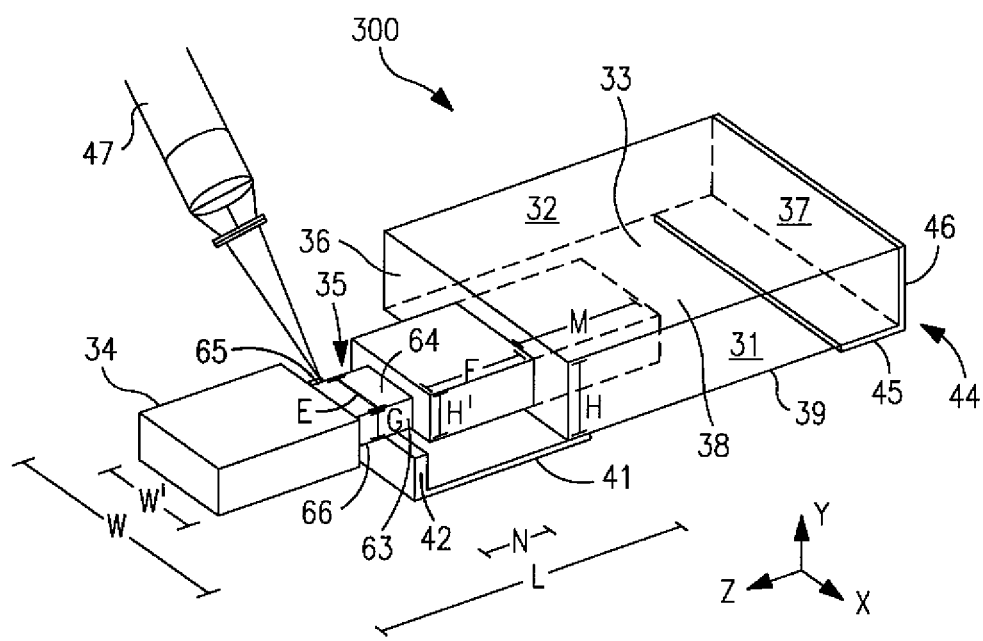
FIG. 3 is a perspective view of another embodiment of the electrolytic capacitor of the present invention.

Further, the thickness/height H' of the anode lead tape 34 is also uniform throughout the anode lead tape except at notch region N, which has a thickness/height G (see FIG. 2). The thickness/height H' can be at least about 5% of the height or thickness H of the front surface 36 of the porous anode body 33. For instance, the thickness/height H' can generally be from about 5% to about 70% of the height or thickness H of the front surface 36 of the porous anode body 33. Further, the thickness/height H' of the anode lead tape 34 can range from about 10 micrometers to about 2800 micrometers, in some embodiments from about 20 micrometers to about 2100 micrometers, and in some embodiments from about 30 micrometers to about 1750 micrometers. In still other embodiments, the thickness/height H' of the anode lead tape 34 can be from about 10% to about 65% of the thickness/height H of the front surface 36 of the porous anode body 33, such as from about 15% to about 60% of the thickness/height H of the front surface 36 of the porous anode body.

Moreover, as is shown in FIG. 1 and as discussed above, in some embodiments, the width E of the notch region N of the anode lead tape 34 is smaller than the width W' of the anode lead tape 34 due to the removal of material from the anode lead tape 34 along the notch region N to form at least one notch 50. The width E of the anode lead tape 34 can be from about 20% to 90% of the width W' of the anode lead tape 34. For example, the width E at notch region N can range from about 16 micrometers to about 4050 micrometers, in some embodiments from about 832 micrometers to about 3375 micrometers, and in some embodiments from about 48 micrometers to about 2700 micrometers. In other embodiments, the width E of the notch region N can be from about 30% to about 80% of the width W', such as from about 40% to about 70% of the width W'.

In another embodiment, as shown in FIG. 2, the thickness/height G of the notch region N of the anode lead tape is smaller than thickness/height H' of the anode lead tape 34 due to the removal of material from the anode lead tape 34 along the notch region N to form at least one notch 50. The thickness/height G of the anode lead tape 34 is generally from about 20% to 90% of the thickness/height H' of the anode lead tape 34. For example, the thickness/height G can range from about 2 micrometers to about 2520 micrometers, and in some embodiments from about 4 micrometers to about 1890 micrometers, and in some embodiments from about 6 micrometers to about 1575 micrometers. In other embodiments, the thickness/height G can be from about 30% to about 80% of the thickness/height H', such as from about 40% to about 70% of the thickness/height H'.

Although FIG. 1 shows that the anode lead tape 34 at the notch 50 has a smaller width E and the same height H' as the remainder of the anode lead tape 34 and FIG. 2 shows that the anode lead tape 34 at the notch 50 has a smaller thickness/height G but the same width W' as the remainder of the anode lead tape, it is to be understood by one of ordinary skill in the art that material can be removed in such a manner so that the anode lead tape 34 at the notch 50 has both a smaller width E and a smaller thickness/height G than the remainder of the anode lead tape 34. For instance, FIG. 3 shows that the anode lead tape 34 at the notch 50 can have both a width E that is less than the width W' of the remainder of the anode lead tape 34 and a thickness/height G that is smaller than thickness/height H' of the remainder of the anode lead tape 34. Further, it is to be understood by one of ordinary skill in the art the at least one notch 50 is not limited to the configurations shown in FIGS. 1-3 and that any combination of altered heights and widths of the anode lead tape 34 on the side surfaces or upper and lower surfaces is possible, so long as at one of the thickness/height or width at the notch 50 is less than the thickness/height or width of the remainder of the anode lead tape 34.

Referring now to FIGS. 1-3, the notch region N can be located anywhere along the second portion L of the anode lead tape 34 (i.e., along the Z-axis) so long as the notch region N is located a sufficient distance F away from the porous anode body 33 such that the capacitor is not damaged when the anode lead tape 34 is welded to an anode termination 35, as is discussed in more detail below. Generally, the ratio of the length of the second portion L to the distance F where the notch 50 is located can be in some embodiments from about 1.1 to about 20, in other embodiments from about 1.5 to about 15, and in still other embodiments from about 2 to about 10. For instance, in one embodiment, the second portion L can have a length that is from about 200 micrometers to about 50 millimeters, in some embodiments from about 400 micrometers to about 30 millimeters, and in some embodiments from about 1000 micrometers to about 10 millimeters. Thus, the distance F to the notch 50 can be from about 10 micrometers to about 45 millimeters when the second portion L has a length that is from about 200 micrometers to about 50 millimeters. Meanwhile, the distance F to the notch 50 can be from about 20 micrometers to about 27 millimeters when the second portion L has a length that is from about 400 micrometers to about 30 millimeters. Further, the distance F to the notch 50 can be from about 50 micrometers to about 9 millimeters when the second portion L has a length that is from about 1000 micrometers to about 10 millimeters.

The notch region N (i.e., the length of the notch 50) can have a length that is from about 10% to about 90% of the second portion L of the anode lead tape 34, which refers to the entire distance that the anode lead tape 34 extends from the front surface 36 of the porous anode body 33. As discussed above, in one embodiment, the second portion L can be from about 200 micrometers to about 50 millimeters, in some embodiments from about 400 micrometers to about 30 millimeters, and in some embodiments from about 1000 micrometers to about 10 millimeters. Hence, the notch region N can have a length of from about 20 micrometers to about 45 millimeters, in some embodiments from about 40 micrometers to about 27 millimeters, and in some embodiments from about 100 micrometers to about 9 millimeters.

Generally, the notch 50 can be oriented along the X-axis or the Y-axis, or at any location in between. In the embodiment shown in FIG. 1, for instance, the notch is oriented along the X-axis, while in the embodiment shown in FIG. 2, the notch is oriented along the Y-axis. Regardless of whether material is removed from the anode lead tape 34 to create a smaller width E, a smaller height, G, or both, when material is removed from the anode lead tape 34 along notch region N, at least one notch 50 is formed in the anode lead tape 34, as discussed above. Moreover, the at least one notch 50 can be oriented at various locations around the center point of the anode lead tape 34.

As shown in FIG. 1, the notch 50 can be formed on an X-axis facing surface of the anode lead tape 34, which results in a smaller width E of the anode lead tape 34 along notch region N where welding of the anode lead tape 34 to an anode termination 35 (as shown in FIG. 2) can occur. In another embodiment, as shown in FIG. 2, the notch 50 can be formed on a Y-axis facing surface of the anode lead tape, which results in a smaller thickness/height G of the anode lead tape 34 along notch region N where welding of the anode lead tape 34 to an anode termination (as shown in FIG. 2) can occur. In still another embodiment, as shown in the capacitor 300 depicted in FIG. 3, multiple notches 63-66 can be formed on both the X-axis and Y-axis facing surfaces of the anode lead tape 34, which results in a smaller width E and a smaller thickness/height G of the anode lead tape 34 at the notch region N. For instance, notch 63 is formed on the right side of the tape, notch 64 is formed on the upper surface of the tape, notch 65 is formed on the right side of the tape, and notch 66 is formed on the lower surface of the tape. Other possible orientations for the at least one notch are discussed in more detail in reference to FIGS. 4-11 below.

As already discussed in reference to FIG. 3 and as is discussed in more detail below in reference to FIGS. 5-6 and 9-10, there can be more than one notch formed at notch region N. For instance, two notches can be formed at various locations around the center point of the anode lead tape. In one particular embodiment, one notch can be formed on an X-axis facing surface 70 of the anode lead tape 34, and another notch can be formed on an opposing X-axis facing surface 71 of the anode lead tape 34. In another embodiment, one notch can be formed on a Y-axis facing surface 72 of the anode lead tape 34, and another notch can be formed on an opposing Y-axis facing surface 73 of the anode lead tape 34. Regardless of where any two notches are formed on the anode lead tape, the notches can be symmetrical about the center point of the tape.

Furthermore, regardless of the manner in which the one or more notches are oriented around a center point of the anode lead tape 34, as shown in FIGS. 1-3, the presence of the at least one notch 50 results in a reduction of the thickness/height H' and or the width W' of the anode lead tape 34 to a smaller thickness/height G and/or a smaller width E at notch region N, which is where welding of the anode lead tape 34 to an anode termination 35 (as shown in FIGS. 2 and 3) can occur. Due to removal of material at notch region N, the density of the anode lead tape 34 is less at the notch region N as compared to the remainder of the second portion L of the anode lead tape 34 that extends from the front surface 36 of porous anode body 33.

Referring again to FIGS. 1-3, regardless of its geometry or orientation around the center point of the anode lead tape 34, the at least one notch 50 is formed by removal of material at notch region N of the anode lead tape 34. The material can be removed from the anode lead tape 34 to form the notch 50 by cutting, punching, or sawing. Any technique known to one of ordinary skill in the art can be used. For instance, to cut away material from the anode lead tape 34 to form a notch 50, a cutting tool can be used. On the other hand, the notch 50 can be formed via a punching tool. The punching tool construction can offer high accuracy with minimalization of pre-settings. The special designed punches can be made typically from tungsten carbide, hardened steels or derivatives. A common Brinell hardness value for punching materials can be within the range of from about 1,500 $MN/m^2$ to about 1,900 $MN/m^2$, which can be compared to the hardness value of the sintered tantalum material, which can be 500 $MN/m^2$, for example.

The notch can also be formed by a saw that, for instance, utilizes strong diamond blades for precise shape and depth control. The special designed blades can be made typically from hardened resin coated diamond grit (75%). The thickness of the blades can be within the range of from about 50 micrometers to about 1,500 micrometers. Meanwhile, the size of diamond grit can be within the range from about 80 to about 1,200 micrometers.

The material can also be removed by a laser to form the notch 50. For instance, a laser can be used on scan mode to carry out erosion of the anode lead tape at the notch region N. For instance, the erosion caused by the laser treatment can create a rough surface, such as the stepped notch shown in FIGS. 7 and 11, which can facilitate laser welding of the anode lead tape 34 to the anode termination 35. The notch can be formed by a single laser shot where each pulse can last for about 0.2 milliseconds to about 20 milliseconds at a spot diameter of from about 0.1 millimeters to about 0.3 millimeters. The notch can also be formed by multiple laser shots where each laser pulse can last for about 0.2 milliseconds to about 0.5 milliseconds (for each pulse) at a spot diameter from about 0.1 millimeters to about 0.3 millimeters. The typical working area can be about 1.0 millimeters in length and about 0.5 millimeters in width.

Regardless of the particular design or manner in which the capacitor is formed, it can be connected to terminations as is well known in the art. For example, anode and cathode terminations may be electrically connected to the anode tape(s) and the cathode, respectively. The specific configuration of the terminations may vary as is well known in the art. Although not required, in one embodiment, as shown in FIGS. 2-3, for example, the cathode termination 44 can contain a planar portion 45 in electrical contact with a lower surface 39 of the capacitor element and an upstanding portion 46 positioned substantially perpendicular to the planar portion 45 and in electrical contact with a rear surface 38 of the capacitor element. To attach the capacitor element to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Referring again to FIGS. 2-3, although not required, the anode termination 35 may likewise contain a planar portion 41 and an upstanding portion 42. The upstanding portion 42 may contain a region that carries the anode lead tape 34 of the present invention. For example, the region may possess a slot for receiving the anode lead tape 34. The slot may have any desired shape, and can be U-shaped, V-shaped, circular, rectangular, square, stepped, etc. for further enhancing surface contact and mechanical stability of the anode lead tape 34 at the notch region N. For instance, the geometry of the slot may match the geometry of the notch 50. After the at least one notch has been formed in the anode lead tape, the anode lead tape 34 can then be electrically connected to the anode termination 35. Any technique may be used to connect the lead tape 34 to the anode termination 35, such as by laser welding, by resistance welding, or the use of conductive adhesives, etc. Regardless of the particular welding technique used connect the anode lead tape 34 to the anode termination 35, the amount of energy required to form a sufficient weld is reduced because of the notch 50. Because of the notch 50, there is less material at the notch region N along the lead tape 34, so welding at this region requires less energy than if welding were to occur at a point along the second portion L of the anode lead tape having a height/thickness H' and a width W'. The smaller thickness/height G and/or the smaller width E at notch region N created by the formation of notch 50 means that less anode lead tape material must be heated to create a sufficient spot weld between the anode lead tape 34 and the anode termination 35. Thus, by forming at least one notch 50 in an anode lead tape 34, a relatively thick anode lead tape can still be used to create improved contact with the porous anode body to reduce ESR, yet the welding process to form an electrical connection with an anode termination can still be carried out in an efficient and cost-effective manner due to the reduced thickness of the anode lead tape at the notch. Although the anode lead tape 34 can be welded to the anode termination 35 by any technique generally known to one of skill in the art, FIGS. 2-3 show the anode lead tape 34 being welded to the anode termination 35 at an upstanding portion 42 of the anode termination 35 via a laser 47.

Any laser welding technique can be utilized, such as the technique described in U.S. Patent Application Publication No. 2010/0072179 to Dvorak, et al., which is incorporated herein in its entirety by reference thereto for all purposes. For instance, laser welding an anode lead tape to an anode termination can involve directing a laser beam through one or more refraction elements before it contacts the lead tape and anode termination. By selectively controlling the index of refraction and thickness of the refraction element, the angle at which the refraction element is positioned relative to the laser beam, etc., the laser beam may be directed to a precise weld location, such as at the notch 50 positioned a sufficient distance F away from the porous anode body, without substantially contacting and damaging other parts of the capacitor, including the porous anode body.

When a laser is also used to form the notch 50 via removing material from the anode lead tape 34, the amount of energy used to form the notch 50 and then sequentially create the weld at the anode termination 35 are different. Generally, the energy required to form a notch is from about 6 Joules to about 16 Joules, while the energy required to weld the anode lead wire to the anode termination is from about 6 Joules to about 26 Joules in cases of single laser shot.

Further, once the capacitor element is formed and is attached to the terminations as discussed above, it can be enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

Turning now to FIGS. 4-11, various embodiments of possible notch geometries are discussed in more detail. Referring now to FIG. 4, a top view of a capacitor element 400 having an anode lead tape 34. A square-shaped notch 51 is formed at notch region N. The notch 51 is present on an X-axis facing surface 70 of the anode lead tape 34. The notch is located at a distance F away from the porous anode body 33 along second portion L of anode lead tape 34. Because of removal of material from the anode lead tape 34 to form the square-shaped notch 51, the material density of the anode lead tape 34 at the notch region N is less than the material density of the anode lead tape 34 along the remainder of the second portion L of the anode lead tape 34. Additionally, the width E of the anode lead tape 34 at notch 51 is less than the width W' of the remainder of the anode lead tape 34.

Another embodiment of a top view of a capacitor element 500 is shown in FIG. 5. Two rectangular-shaped notches 52 and 53 are formed at notch region N. Notch 52 is present on an X-axis facing surface 70 and notch 53 is present on an opposing X-axis facing surface 71 of the anode lead tape 34 such that the anode lead tape is symmetrical at the notch region N. The notches are located at a distance F away from the porous anode body 33 along second portion L of the anode lead tape 34. Again, because of removal of material from the anode lead tape 34 to form the rectangular-shaped notches 52 and 53, the material density of the anode lead tape 34 at the notch region N is less than the material density of the anode lead tape 34 along the remainder of the second portion L of the anode lead tape 34. Additionally, the width E of the anode lead tape 34 at notches 52 and 53 is less than the width W' of the remainder of the anode lead tape 34.

Yet another embodiment of a top view of a capacitor element 600 is shown in FIG. 6. Two triangular-shaped notches 54 and 55 are formed at notch region N. Notch 54 is present on an X-axis facing surface 70 and notch 55 is present on an opposing X-axis facing surface 71 of the anode lead tape 34 such that the anode lead tape is symmetrical at the notch region N. The notches are located at a distance F away from the porous anode body 33 along second portion L of the anode lead tape 34. Once again, because of removal of material from the anode lead tape 34 to form the triangular-shaped notches 54 and 55, the material density of the anode lead tape 34 at the notch region N is less than the material density of the anode lead tape 34 along the remainder of the second portion L of the anode lead tape 34. Further, the width E of the anode lead tape 34 at notches 54 and 55 is less than the width W' of the remainder of the anode lead tape 34. In FIG. 6, the triangular-shaped notches 54 and 55 result in a non-uniform width E at the notch region N, and thus, the width E as described in FIG. 6 refers to the smallest width of the anode lead tape 34 at the notch region N along the length L'.

Still another embodiment of a top view of a capacitor element 700 is shown in FIG. 7. A stepped-shaped notch 56 is formed at notch region N. Notch 56 is present on an X-axis facing surface 71 of the anode lead tape 34. The notch is located at a distance F away from the porous anode body 33 along second portion L of the anode lead tape 34. Once again, because of removal of material from the anode lead tape 34 to form the stepped-shaped notch 56, the material density of the anode lead tape 34 at the notch region N is less than the material density of the anode lead tape 34 along the remainder of the second portion L of the anode lead tape 34. Further, the width E of the anode lead tape 34 at notch 56 is less than the width W' of the remainder of the anode lead tape 34. In FIG. 7, the stepped-shaped notch 56 results in a non-uniform width E at the notch region N, and thus, width E as described in FIG. 7 refers to the smallest width of the anode lead tape 34 at the notch region N.

Figure 8:
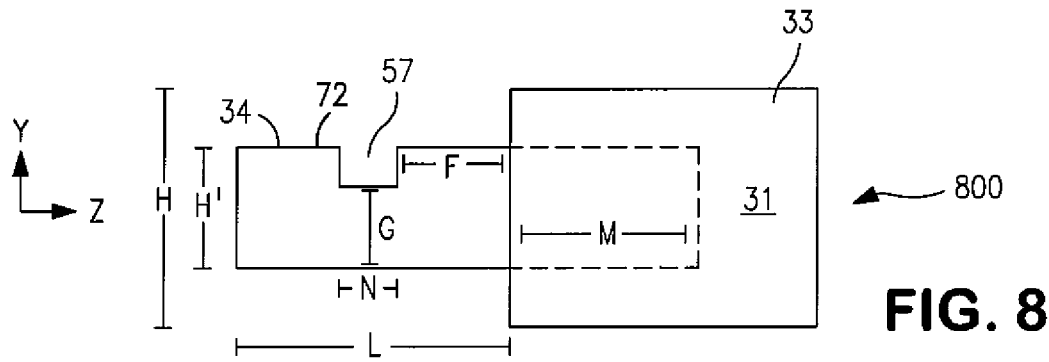
FIG. 8 is a side view of one embodiment of the electrolytic capacitor of the present invention.

While FIGS. 4-7 show various embodiments of a capacitor element where the notches are formed on X-axis facing surfaces of the anode lead tape, FIGS. 8-11 show various embodiments of a capacitor element where the notches are formed on Y-axis facing surfaces of the anode lead tape. Referring first to FIG. 8, a side view of a capacitor element 800 having an anode lead tape 34 is shown. A square-shaped notch 57 is formed at notch region N. The notch 57 is present on a Y-axis facing surface 72 of the anode lead tape 34. The notch is located at a distance F away from the porous anode body 33 along second portion L of the anode lead tape 34. Because of removal of material from the anode lead tape 34 to form the square-shaped notch 57, the material density of the anode lead tape 34 at the notch region N is less than the material density of the anode lead tape 34 along the remainder of the second portion L of the anode lead tape 34. Additionally, the thickness/height G of the anode lead tape 34 at notch 57 is less than the thickness/height H' of the remainder of the anode lead tape 34.

Figure 9:
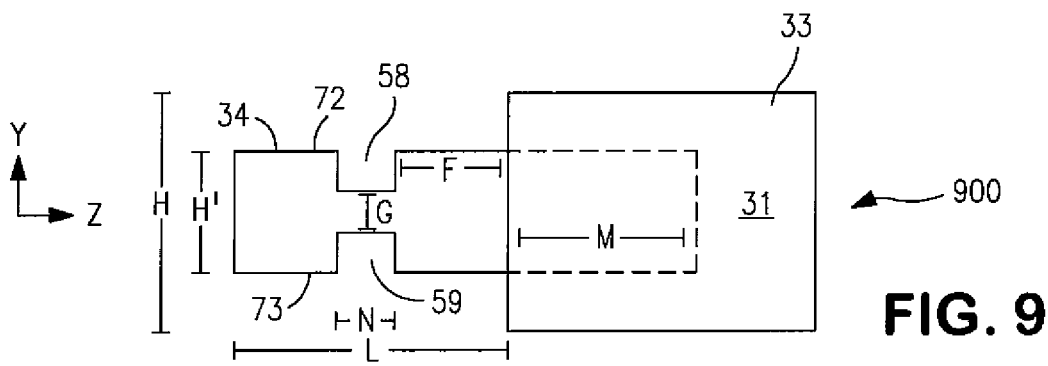
FIG. 9 is a side view of another embodiment of the electrolytic capacitor of the present invention.

Another embodiment of a side view of a capacitor element 900 is shown in FIG. 9. Two rectangular-shaped notches 58 and 59 are formed at notch region N. Notch 58 is present on a Y-axis facing surface 72 and notch 59 is present on an opposing Y-axis facing surface 73 of the anode lead tape such that the anode lead tape is symmetrical at the notch region N.

The notches are located at a distance F away from the porous anode body 33 along second portion L of the anode lead tape 34. Again, because of removal of material from the anode lead tape 34 to form the rectangular-shaped notches 58 and 59, the material density of the anode lead tape 34 at notch region N is less than the material density of the anode lead tape 34 along the remainder of the second portion L of the anode lead tape 34. Additionally, the thickness/height G of the anode lead tape 34 at notches 58 and 59 is less than the thickness/height H' of the remainder of the anode lead tape 34.

Figure 10:
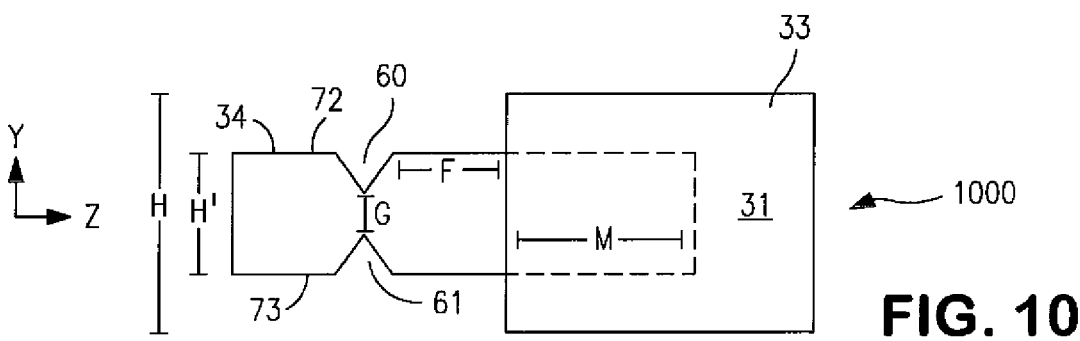
FIG. 10 is a side view of still another embodiment of the electrolytic capacitor of the present invention.

Yet another embodiment of a top view of a capacitor element 1000 is shown in FIG. 10. Two triangular-shaped notches 60 and 61 are formed at notch region N. Notch 60 is present on a Y-axis facing surface 72 and notch 61 is present on an opposing Y-axis facing surface 73 of the anode lead tape 34 such that the anode lead tape is symmetrical at the notch region N. The notches are located at a distance F away from the porous anode body 33 along the second portion L of the anode lead tape 34. Once again, because of removal of material from the anode lead tape 34 to form the triangular-shaped notches 60 and 61, the material density of the anode lead tape 34 at the notch region N is less than the material density along the remainder of the second portion L of the anode lead tape 34. Further, the thickness/height G of the anode lead tape 34 at notches 60 and 61 is less than the thickness/height H' of the remainder of the anode lead tape 34. In FIG. 10, the triangular-shaped notches 60 and 61 result in a non-uniform thickness/height G at the notch region N, and thus, the thickness/height G as described in FIG. 10 refers to the smallest thickness/height at the notch region N.

Figure 11:
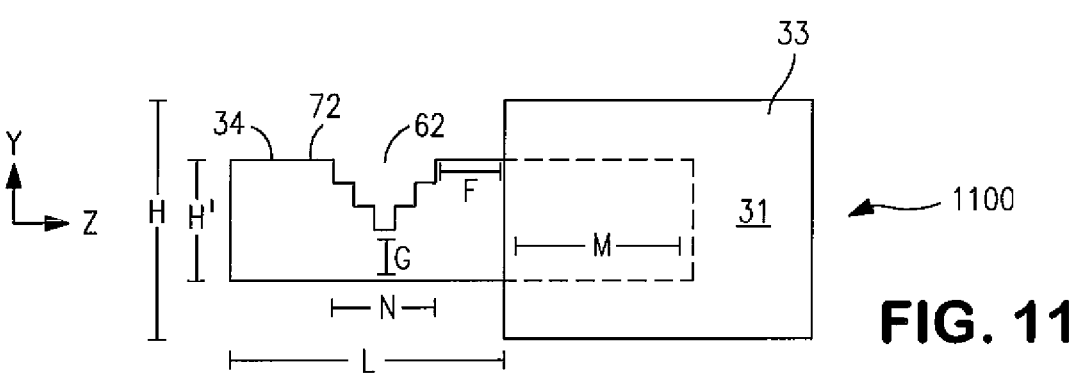
FIG. 11 is a side view of yet another embodiment of the electrolytic capacitor of the present invention.

Still another embodiment of a top view of a capacitor element 1100 is shown in FIG. 11. A stepped-shaped notch 62 is formed at notch region N. Notch 62 is present on a Y-axis facing surface 71 of the anode lead tape 34. The notch is located at a distance F away from the porous anode body 33 along second portion L. Once again, because of removal of material from the anode lead tape 34 to form the stepped-shaped notch 62, the material density of the anode lead tape 34 at the notch region N is less than the material density along the remainder of the second portion L of the anode lead tape 34. Further, the thickness/height G of the anode lead tape 34 at notch 62 is less than the thickness/height H' of the remainder of the anode lead tape 34. In FIG. 11, the stepped-shaped notch 62 results in a non-uniform thickness/height G at the notch region N, and thus, the thickness/height G as described in FIG. 11 refers to the smallest thickness/height of the anode lead tape 34 at the notch region N.

Turning now to the separate components of the capacitor element, the porous anode body 33 is typically formed from a valve metal composition having a high specific charge, such as about 5,000 µF*V/g or more, in some embodiments about 10,000 µF*V/g or more, in some embodiments about 20,000 µF*V/g or more. As noted above, the lead tape of the present invention can be particularly useful for "high specific charge" powders, which tend to shrink and pull away from the lead tape during sintering to a greater extent than lower specific charge powders. Such powders typically have a specific charge of from about 10,000 to about 600,000 µF*V/g, in some embodiments from about 40,000 to about 500,000 µF*V/g, in some embodiments from about 70,000 to about 400,000 µF*V/g, in some embodiments from about 100,000 to about 350,000 µF*V/g, and in some embodiments, from about 150,000 to about 300,000 µF*V/g. The valve metal composition contains a valve metal (La, a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H. C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, the powder is compacted around the anode lead tape 34 so that at least a portion of the anode lead assembly extends from the compacted porous anode body 33. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the lead tape 34 may be embedded therein. The die may define a single or multiple slots that allow for the insertion of the tape. If more than one lead tape is employed, the lead tapes can be placed in close proximity to each other in order to be sinter-bonded, although this is not required. After filling the die with powder and embedding the lead tapes therein, the die cavity may then be closed and subjected to compressive forces by a punch. Typically, the compressive forces are exerted in a direction that is either generally parallel or generally perpendicular to the length "of the anode lead tape, which extends along a longitudinal axis. This forces the particles into close contact with the tape and creates a strong tape-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body 33 is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Once constructed, a dielectric layer may be formed by anodically oxidizing ("anodizing") the sintered anode body. This results in the formation of a dielectric layer that is formed over and/or within the pores of the anode body. For example, a tantalum (Ta) anode may be anodized to tantalum pentoxide ($Ta_2O_5$). Typically, anodization is performed by initially applying a solution to the anode, such as by dipping the anode into an electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The voltage applied during the dielectric layer formation process controls the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be performed at ambient temperature or lower. The resulting dielectric layer may be formed on a surface of the anode and within its pores.

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such layers are typically π-conjugated and have electrical conductivity after oxidation or reduction, such as an electrical conductivity of at least about 1 $\mu S\ cm^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

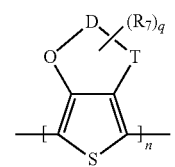

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

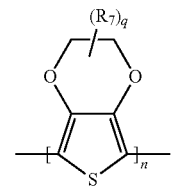

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

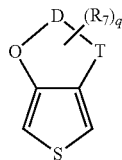

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

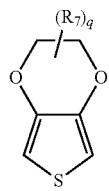

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1\times10^5$ Ω/cm, and in some embodiments, greater than about $1\times10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or triglycerides, which have a glycerol backbone with one, two, and three, respectively, fatty acyl residues that are esterified. For instance, some suitable drying oils that may be used include, but are not limited to, olive oil, linseed oil, castor oil, lung oil, soybean oil, and shellac. These and other protective coating materials are described in more detail U.S. Pat. No. 6,674,635 to Fife, et al., which is incorporated herein in its entirety by reference thereto for all purposes.

The anode part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

As a result of the present disclosure, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 to about 50 mΩ, and in some embodiments, from about 0.1 to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 μA/μF*V, in some embodiments less than about 0.01 μA/μF*V, and in some embodiments, less than about 0.001 μA/μF*V, wherein μA is microamps and uF*V is the product of the capacitance and the rated voltage.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Laser Weld:

The laser weld was done using a Trumpf Nd:YaG HAAS laser (emitting near IR light at wavelength around 1,064 nanometers). The energy to weld generally refers to the amount of laser energy required to bond the anode lead wire to the anode termination/lead frame. The energy to weld is settled in Joules.

Example 1

40,000 μFV/g tantalum powder was pressed into pellets to form porous bodies having a size of 5.20 mm (length), 3.70 mm (width) and 0.90 mm (height/thickness). The tantalum powder was charged into the hopper of a tantalum device automatic molding machine and automatically molded together with a 1.50 mm (width) and 0.35 mm (height/thickness) tantalum tape to manufacture a porous body. The penetration of the tape was 70% of the anode length. This molded body was left standing under reduced pressure at 1,450° C. to obtain a sintered body.

The porous sintered tantalum body was welded to an auxiliary stainless steel strip when the anode lead tape was notched during the loading process via a punching tool in the specific area important for bonding the lead wire to the lead frame. The reduced area had a 1.00 mm width.

The tantalum anode was not processed. A copper-based lead frame was used to simulate the assembly process. The capacitor element was attached via a laser welding process to bond the anode lead tape to the anode termination. Next, the ESR contribution was measured with the appropriate method (two contacts on the positive lead frame termination and two contacts on the sintered but not formed anode body).

Comparative Examples 1A-1B

Capacitors were formed in the manner described in Example 1, except that an additional punching device was used for the tape notching. For the comparative examples, the tantalum powder was molded together with a 0.24 mm width (example 1A) and a 0.50 mm width (example 1B) tantalum wire. Multiple parts (90) were made in the manner described and then tested for ESR performance also. Table 1 summarizes the tantalum wire/tape diameters, as well as the median ESR from example 1 compared with that of comparative examples 1A-1B.

TABLE 1

|  | Ta wire diameter/tape height × width [mm] | Ta wire diameter/tape notched area height × width [mm] | ESR [mΩ] |
|---|---|---|---|
| Example 1 | 0.35 × 1.50 | 0.35 × 1.00 | 3.3 |
| Comparative Example 1A | 0.24 | 0.24 | 9.8 |
| Comparative Example 1B | 0.50 | 0.50 | 4.8 |

Example 2

70,000 μFV/g tantalum powder was pressed into pellets to form porous bodies having a size of 1.80 mm (length), 2.40 mm (width) and 1.20 mm (height/thickness). The tantalum powder was charged into the hopper of a tantalum device automatic molding machine and automatically molded together with a 1.50 mm (width) and a 0.15 mm (height/thickness) tantalum tape to manufacture a porous body. The penetration of tape was 70% of the anode length. This molded body was left standing under reduced pressure at 1,300° C. to obtain a sintered body.

The porous sintered tantalum body was welded to an auxiliary stainless steel strip when the anode lead tape was notched during the loading process via a punching tool in the specific area important for bonding the lead wire to the lead frame. The reduced area had a 1.00 mm width.

The measurement of ESR was done in the manner described in Example 1.

Comparative Examples 2A-2B

Capacitors were formed in the manner described in Example 2, except that an additional punching device was used for the tape notching. For the comparative examples, tantalum powder was molded together with a 0.17 mm width (example 2A) and a 0.50 mm width (example 1B) tantalum wire. Multiple parts (90) were made in the manner described and then tested for ESR performance also. Table 2 summarizes the tantalum wire/tape diameters, as well as the median of ESR from example 2 compared with that of comparative examples 2A-2B.

TABLE 2

|  | Ta wire diameter/tape height ×width [mm] | Ta wire diameter/tape notched area height × width [mm] | ESR [mΩ] |
|---|---|---|---|
| Example 2 | 0.15 × 1.50 | 0.15 × 1.00 | 1.8 |
| Comparative Example 2A | 0.17 | 0.17 | 12.6 |
| Comparative Example 2B | 0.50 | 0.50 | 2.9 |

Example 3

150,000 μFV/g tantalum powder was pressed into pellets to form porous bodies having a size of 2.30 mm (length), 2.30 mm (width) and 0.55 mm (height/thickness). The tantalum powder was charged into the hopper of a tantalum device automatic molding machine and automatically molded together with a 1.50 mm (width) and 0.15 mm (thickness) tantalum tape to manufacture a porous body. The penetration of the tape was 70% of the anode length. This molded body was left standing under reduced pressure at 1,200° C. to obtain a sintered body.

The porous sintered tantalum body was welded to an auxiliary stainless steel strip when the anode lead tape was notched during the loading process via a punching tool in the specific area important for bonding the lead wire to the lead frame. The reduced area had a 1.00 mm width.

The measurement of ESR was done in the manner described in Example 1.

Comparative Example 3A

Capacitors were formed in the manner described in Example 3, except that an additional punching device was used for the tape notching. For the comparative example, the tantalum powder was molded together with a 0.17 mm width (example 3A) tantalum wire. Multiple parts (90) were made in the manner described and then tested for ESR performance also. Table 3 summarizes the tantalum wire/tape diameters, medians of ESR from example 3 and compared with comparative example 3A.

TABLE 3

| | Ta wire diameter/tape height × width [mm] | Ta wire diameter/tape notched area height × width [mm] | ESR [mΩ] |
|---|---|---|---|
| Example 3 | 0.15 × 1.50 | 0.15 × 1.00 | 8.2 |
| Comparative Example 3A | 0.17 | 0.17 | 17.6 |

As shown in the table 1, 2 and 3, the benefit of using a notched tape versus an unnotched wire is for better ESR values when compared with the comparative examples.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor that comprises a capacitor element, the capacitor element comprising:
   a sintered, porous anode body having a height and a width;
   an anode lead tape having a thickness and further having a width that is at least about 20% of the width of the porous anode body, wherein the anode lead tape has a first portion positioned within the anode body and has a second portion extending from a surface of the anode body in a longitudinal direction, the second portion including a first surface and an opposing second surface, the second portion further having a notched region wherein a first notch is located on the first surface at the notched region, wherein the first notch is the only notch located on the first surface, wherein an anode termination is electrically connected to the anode lead tape, wherein the anode lead tape is welded to the anode termination at the first notch;
   a dielectric layer overlying the sintered porous anode body; and
   a cathode overlying the dielectric layer that includes a solid electrolyte.

2. The solid electrolytic capacitor of claim 1, wherein the width of the anode lead tape is from about 80 micrometers to about 4500 micrometers.

3. The solid electrolytic capacitor of claim 1, wherein the notched region has a width that is from about 20% to about 90% of the width of the anode lead tape.

4. The solid electrolytic capacitor of claim 1, wherein the thickness of the anode lead tape is from about 10 micrometers to about 2800 micrometers.

5. The solid electrolytic capacitor of claim 1, wherein the notched region has a thickness that is from about 20% to about 90% of the thickness of the anode lead tape.

6. The solid electrolytic capacitor of claim 1, wherein the notched region is located a distance away from the surface of the anode body such that the ratio of the length of the second portion of the anode lead wire to the distance from the surface of the anode body to the location of the notched region is from about 1.1 to about 20.

7. The solid electrolytic capacitor of claim 1, wherein the notch is formed by cutting, punching, or sawing the anode lead tape.

8. The solid electrolytic capacitor of claim 1, wherein the notch is formed by a laser.

9. The solid electrolytic capacitor of claim 1, wherein the notch is rectangular, square, circular, elliptical, triangular, stepped, U-shaped, or V-shaped.

10. The solid electrolytic capacitor of claim 1, wherein a second notch is located on the second surface at the notched region formed in the anode lead tape.

11. The solid electrolytic capacitor of claim 10, wherein the two notches are symmetrical.

12. The solid electrolytic capacitor of claim 1, wherein the anode body is formed from a powder having a specific charge of from about 10,000 μF*V/g to about 600,000 μF*V/g, wherein the powder comprises a valve metal such as tantalum, niobium, aluminum, hafnium, titanium, an electrically conductive oxide thereof, or an electrically conductive nitride thereof.

13. The solid electrolytic capacitor of claim 1, further comprising a cathode termination that is electrically connected to the cathode, and a molding material that encapsulates the capacitor element and leaves exposed at least a part of the anode termination and at least a part of the cathode termination.

14. The solid electrolytic capacitor of claim 1, wherein the anode lead tape is laser welded to the anode termination at the notched region.

15. A method for forming a solid electrolytic capacitor comprising a sintered, porous anode body having a height and a width, the method comprising:
   positioning a first portion of an anode lead tape having a thickness and further having a width that is at least about 20% of the width of the porous anode body within a powder formed from a valve metal composition such that a second portion of the anode lead tape extends from a surface of the anode body in a longitudinal direction, the second portion including a first surface and an opposing second surface;

compacting the powder around the first portion of the anode lead tape;

sintering the compacted powder and the first portion of the anode lead tape to form the porous anode body;

forming a notched region in the second portion of the anode lead tape, wherein a first notch is formed on the first surface at the notched region, wherein the first notch is the only notch located on the first surface; and welding the anode lead tape to an anode termination at the first notch to form an electrical connection between the anode lead tape and the anode termination.

16. The method of claim 15, wherein the width of the anode lead tape is from about 80 micrometers to about 4500 micrometers.

17. The method of claim 15, wherein the notched region has a width that is from about 20% to about 90% of the width of the anode lead tape.

18. The method of claim 15, wherein the thickness of the anode lead tape is from about 10 micrometers to about 2800 micrometers.

19. The method of claim 15, wherein the notched region has a thickness that is from about 20% to about 90% of the thickness of the anode lead tape.

20. The method of claim 15, wherein the notch is formed by cutting, punching, or sawing.

21. The method of claim 15, wherein the notch is formed by a laser.

22. The method of claim 15, wherein the anode lead tape is laser welded to the anode termination at the notched region to form an electrical connection between the anode lead tape and the anode termination.

23. The method of claim 15, wherein the notch is formed by a laser and wherein the anode lead tape is sequentially laser welded to the anode termination at the notched region to form an electrical connection between the anode lead tape and the anode termination.

24. The method of claim 23, wherein the laser is used at a first energy level to form the notch and is sequentially used at a second energy level to laser weld the anode lead tape to the anode termination.

25. The method of claim 15, wherein the notch is rectangular, square, circular, elliptical, triangular, stepped, U-shaped, or V-shaped.

26. The method of claim 15, wherein a second notch is formed on the second surface at the notched region.

27. The method of claim 26, wherein the two notches are symmetrical.

* * * * *

UNITED STATES PATENT AND TRADEMARK OFFICE
CERTIFICATE OF CORRECTION

| | | |
|---|---|---|
| PATENT NO. | : 8,842,419 B2 | Page 1 of 1 |
| APPLICATION NO. | : 13/483312 | |
| DATED | : September 23, 2014 | |
| INVENTOR(S) | : Lotfi Djebara et al. | |

It is certified that error appears in the above-identified patent and that said Letters Patent is hereby corrected as shown below:

In the Claims

Claim 1 (column 21, line 65)

"...the second portion further having a notched region..." should read --...the second portion further having a notched region,...--

Signed and Sealed this
Twenty-seventh Day of January, 2015

Michelle K. Lee
*Deputy Director of the United States Patent and Trademark Office*